Jan. 12, 1926.

J. W. URIE 1,569,687

NONSKID DEVICE

Filed Sept. 17, 1925    2 Sheets-Sheet 1

Inventor

J. W. Urie

By John Milton Jester

Attorney

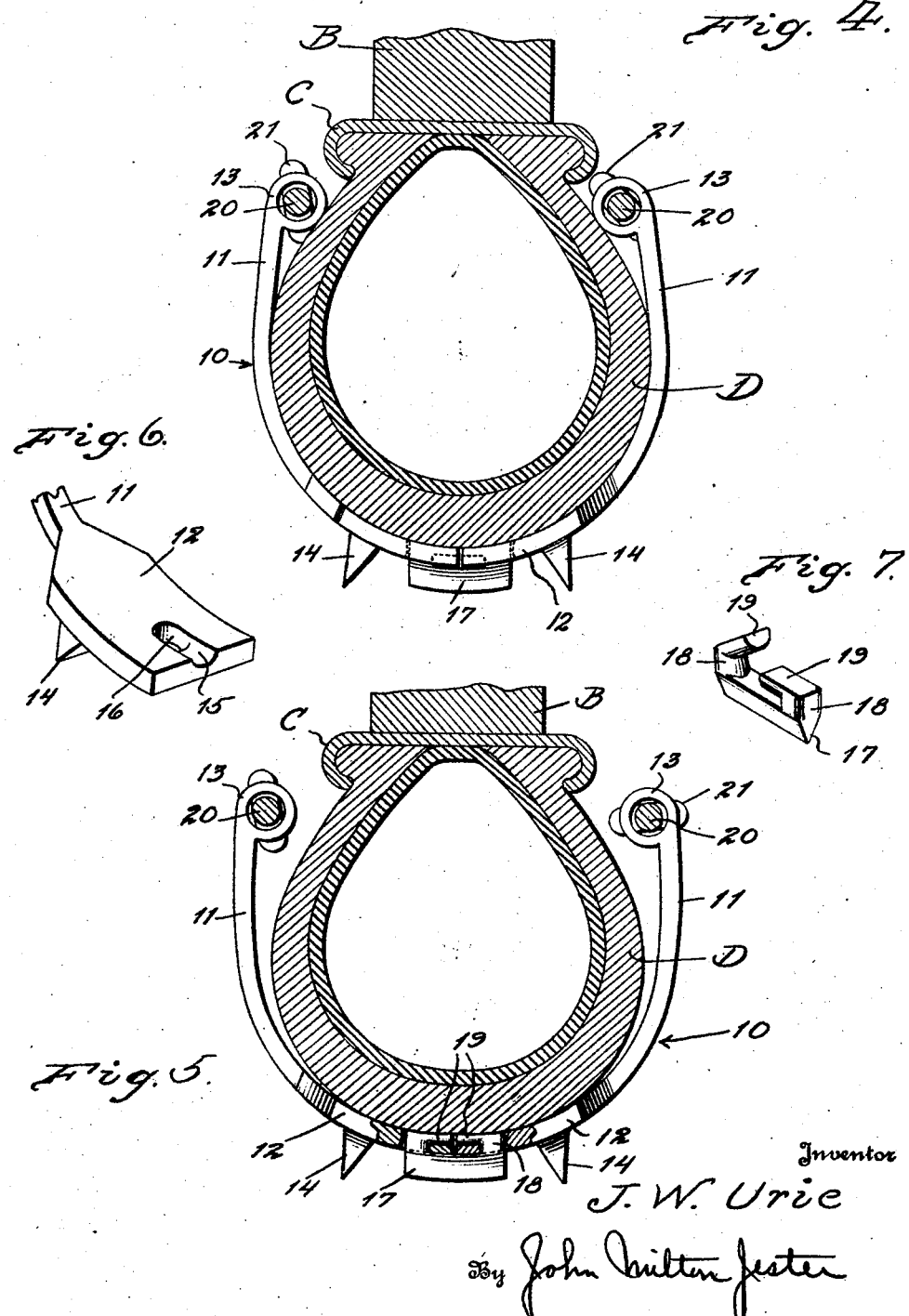

Patented Jan. 12, 1926.

1,569,687

UNITED STATES PATENT OFFICE.

JAMES W. URIE, OF CARSON CITY, MICHIGAN, ASSIGNOR OF ONE-HALF TO JAMES C. GOOLTHRITE, OF CARSON CITY, MICHIGAN.

NONSKID DEVICE.

Application filed September 17, 1925. Serial No. 56,880.

*To all whom it may concern:*

Be it known that I, JAMES W. URIE, a citizen of the United States, residing at Carson City, in the county of Montcalm and State of Michigan, have invented certain new and useful Improvements in Nonskid Devices, of which the following is a specification.

This invention relates to non-skid devices for use on the wheels of motor vehicles such as automobiles, trucks and the like and has for its object the provision of a novel device adapted to be engaged upon a pneumatic or cushion tire in embracing relation thereto and provided with means engageable with the surface traveled over for the purpose of insuring traction by preventing spinning of the wheel in mud, snow or the like, and preventing side slipping or skidding on wet or otherwise slippery surfaces.

A more specific object is to provide a non-skid device including a series or plurality of non-skid elements arranged in spaced relation and flexibly connected whereby they may creep to a limited extent with respect to the tire so that undue wear at any certain points or areas will be avoided.

Yet another object is to provide a device of this character in which the individual non-skid elements or members are formed of movably connected sections whereby they may accommodate themselves to the bulging of the tire walls during travel while remaining ordinarily in place with sufficient snugness to prevent objectionable looseness and rattling.

A still more specific object is to provide a non-skid element carrying calks arranged longitudinally of the tire, the elements being connected by transverse calks so formed and mounted as to provide a pivotal connection for the elements so that the necessary movement or play may be had.

An additional object of the invention is to provide a non-skid device of this character which will be simple and inexpensive in manufacture, easy to install, positive in action, efficient and durable in service, and a general improvement in the art.

With the above and other objects and advantages in view, the invention consists in the details of construction and arrangement of parts to be hereinafter more fully described and claimed, and illustrated in the accompanying drawings in which:

Figure 1:
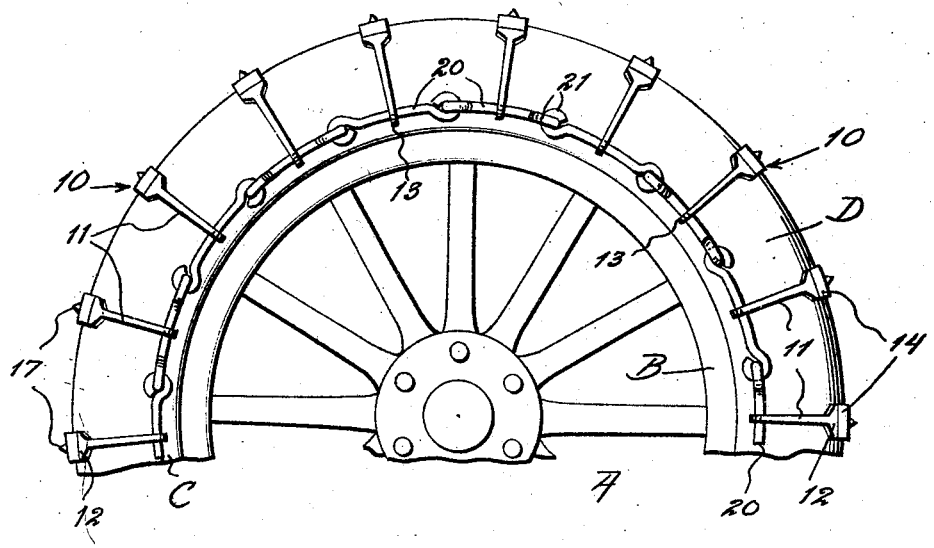
Figure 1 is a side elevation of a portion of a vehicle wheel and tire with the device in applied position.
Figure 2:
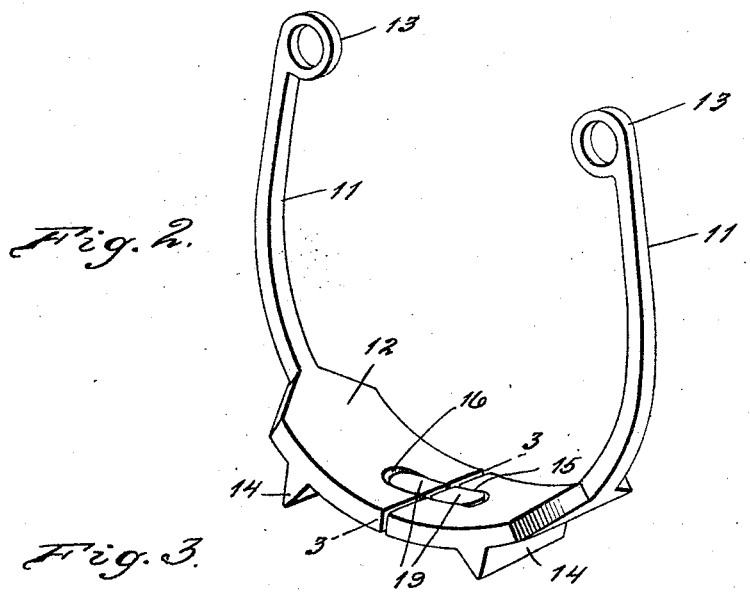
Figure 2 is a perspective view of one of the non-skid members removed.
Figure 3:
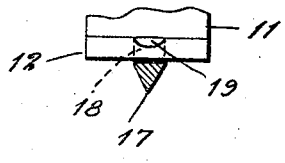
Figure 3 is a detail cross section on the line 3—3 of Figure 2.

Figure 4 is a cross sectional view through the tire and rim, showing an edge elevation of one of the non-skid members in normal position, Figure 5 is a view similar to Figure 4 but showing the pivotal action of the sections or elements of the non-skid members when the tire flattens out upon engagement with the ground or other surface traveled over, Figure 6 is a detail perspective view showing one end of one of the elements and Figure 7 is a detail perspective view of the transverse calk which also constitutes the pivotal connection for the sections or elements, one end of this calk being deflected or distorted to show the structure more clearly.

Referring more particularly to the drawings the letter A designates a portion of a vehicle wheel which may be of the disk or spoke type and which includes a felly B carrying a rim C on which is mounted the tire D which is here represented as of the pneumatic type but which could be of the cushion type. The rim and tire are represented as of the clincher type though this is likewise an immaterial feature inasmuch as my device is capable of use upon any and all styles.

In carrying out the invention I provide a plurality of non-skid members arranged in spaced relation throughout the circumference of the tire and flexibly connected. These non-skid members are designated broadly by the numeral 10 and each includes a pair of elements or sections 11 which are identical in construction. Throughout their lengths the elements 11 are longitudinally curved so as to conform substantially to the cross sectional curvature of the tire, and at one end each element or section 11 is widened as indicated at 12 to provide a tread engaging portion, the other end terminating in an eye 13. The tread engaging portions 12 carry calks 14 which are represented as wedge shaped in cross section and which may be formed integrally upon or secured to the tread engaging portion 12 in any desired manner. These calks extend transversely of the elements or sections 11 but circumferentially or longitudinally with respect to the tire upon which the device is used.

In order that the sections or elements 11 may have a movement with respect to each other to permit or to accommodate themselves to flattening out of the tire or bulging of the side walls thereof as occurs where the tire rolls upon the ground or other surface, I provide or form the end portions of the tread engaging areas 12 of the sections or elements with recesses 15 which extend inwardly from the end and which lead into holes 16. The sections or elements of each pair are pivotally connected by a calk 17 which has its ends formed with shanks or arms 18 extending through the holes 16 and clinched to lie within the recesses or grooves 15 as clearly indicated in Figure 5. Figure 7 shows the detailed construction of these calks and in this figure one arm member or shank is somewhat deflected out of its normal position to illustrate the construction more clearly. It will be observed that the calks 17 are triangular or wedge shaped in cross section and that they extend transversely with respect to the tire and between the longitudinal calks 14. The shanks 18 are preferably cylindrical in shape while the end portions thereof which are upset or clinched, which portions are designated by the numeral 19, are preferably semicylindrical in cross section so that when they lie within the grooves or recesses 15 the surfaces thereof will be flush with the tire engaging surfaces of the tread portions 12 of the sections or elements 11. This flushness is of importance inasmuch as there will be no danger of chafing the tire.

For effecting connection of the successive members 10 and for mounting the entire device upon the tire, I provide a plurality of elongated links 20, the number preferably, though not necessarily, corresponding to the number of members 10. These links are elongated and are engaged through the eyes 13 of the sections or elements 11, the adjacent ends of the links being hooked, as shown at 21 and interengaged. Obviously any connector may be interposed in the two side chains defined by these connected links but such a device is not illustrated as any may be used and as it forms no part of the present invention.

It is quite clear that any desired number of the members 10 may be used and that the size and weight thereof may be varied depending upon the nature of the vehicle on which the non-skid device is used. The complete assembled device is engaged upon the tire in an obvious manner and should be so held as to have a slight looseness so that it may creep upon the tire to avoid the bringing of continual wear upon any points or areas. The peculiar connection of the transverse calks 17 with the elements or sections 11 enables these calks to constitute the pivotal connection therefor and it is obvious that owing to this pivotal connection the sections or elements 11 may swing outwardly and inwardly with respect to each other to accommodate themselves to the bulging of the side walls of the tire during travel so that the tire will not be cramped or bound and consequently chafed. Logically, the longitudinal calks 14 prevent side slipping or skidding and the transverse calks 17 insure traction and prevent idle spinning of the wheel when the vehicle is driven over wet, muddy or otherwise soft and slippery places.

From the foregoing description and a study of the drawings it will be apparent that I have thus provided a simply constructed, inexpensive and easily applied device for the purpose specified which will be a great safeguard in the various respects pointed out. It is believed that the construction, operation and advantages will be readily apparent to one skilled in the art without further explanation.

While I have shown and described a preferred embodiment of the invention, it should be understood that I reserve the right to make such changes in the form, construction and arrangement of parts as will not depart from the spirit of the invention or the scope of the subjoined claims.

Having thus described the invention, I claim:

1. A non-skid device for vehicle tires, comprising a plurality of flexibly connected non-skid members disposable upon a tire in embracing relation thereto, each of said members including a pair of sections, and calks arranged transversely of the members and providing the pivotal connecting means for the sections thereof.

2. A non-skid device for vehicle tires, comprising a plurality of non-skid members disposable upon a tire in embracing relation thereto, means connecting said members, each of said members including a pair of similar sections, and a calk for each member movably connected with the sections thereof for permitting pivotal movement of the sections.

3. In a non-skid device for vehicle tires, a plurality of non-skid members disposable transversely upon a tire in embracing relation thereto, each of said members including a pair of similar longitudinally curved elements each terminating at one end in a tread engaging portion and means pivotally connecting said tread engaging portions comprising transverse calks having angular shanks at their ends, said tread engaging portions of the elements being formed with holes and recesses leading therefrom to the ends and conformingly receiving said angular shanks.

In testimony whereof I affix my signature.

JAMES W. URIE.